(12) United States Patent
Ueki et al.

(10) Patent No.: US 9,293,785 B2
(45) Date of Patent: Mar. 22, 2016

(54) LITHIUM ION SECONDARY BATTERY, VEHICLE, AND BATTERY MOUNTING DEVICE

(75) Inventors: Tomoyoshi Ueki, Toyota (JP); Hideaki Fujita, Kyotanabe (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 77 days.

(21) Appl. No.: 13/498,683

(22) PCT Filed: Mar. 26, 2010

(86) PCT No.: PCT/JP2010/055407
§ 371 (c)(1),
(2), (4) Date: Mar. 28, 2012

(87) PCT Pub. No.: WO2011/118032
PCT Pub. Date: Sep. 29, 2011

(65) Prior Publication Data
US 2013/0011708 A1    Jan. 10, 2013

(51) Int. Cl.
*H01M 10/04* (2006.01)
*H01M 10/0525* (2010.01)
*H01M 2/02* (2006.01)
*H01M 10/0587* (2010.01)
*H01M 2/26* (2006.01)

(52) U.S. Cl.
CPC ........ *H01M 10/0525* (2013.01); *H01M 2/0217* (2013.01); *H01M 2/263* (2013.01);
(Continued)

(58) Field of Classification Search
CPC ................... H01M 10/0431; H01M 10/0481; H01M 10/0587; H01M 2/0217; H01M 10/0468
USPC .......................................................... 429/94
See application file for complete search history.

(56) References Cited

U.S. PATENT DOCUMENTS

| 5,958,088 A | 9/1999 | Vu et al. |
| 2006/0063063 A1* | 3/2006 | Mori et al. ...................... 429/53 |

(Continued)

FOREIGN PATENT DOCUMENTS

| CN | 1297585 | 5/2001 |
| JP | 10-255847 | 9/1998 |

(Continued)

OTHER PUBLICATIONS

Machine translation of JP 2000-182573.*

(Continued)

*Primary Examiner* — Jonathan Jelsma
(74) *Attorney, Agent, or Firm* — Finnegan, Henderson, Farabow, Garrett & Dunner, LLP (57) ABSTRACT

A lithium ion secondary battery includes a flat wound electrode body including a positive electrode sheet and a negative electrode sheet that are wound while interposing therebetween separators into a flat shape, and a battery case. In the flat wound electrode body, a central portion has a more constricted shape than end portions by pressing toward a winding axis in a short-side direction and each end portion includes an end-portion positive electrode sheet, an end-portion negative electrode sheet, and end-portion separators, and a core member arranged more inward than them. With tensile forces generated by pressing of the central portion in a central-portion positive electrode sheet, central-portion negative electrode sheet, and central-portion separators, the end-portion positive electrode sheet, end-portion negative electrode sheet, and end-portion separators are in pressure contact with each other and press the outer surfaces of the core member.

3 Claims, 12 Drawing Sheets

(52) U.S. Cl.
CPC ...... *H01M10/0431* (2013.01); *H01M 10/0468* (2013.01); *H01M 10/0481* (2013.01); *H01M 10/0587* (2013.01); *Y02E 60/122* (2013.01); *Y02T 10/7011* (2013.01)

(56) References Cited

U.S. PATENT DOCUMENTS

2006/0275659 A1* 12/2006 Kim et al. ................ 429/186
2009/0077794 A1* 3/2009 Hirakawa et al. .......... 29/623.2
2009/0136832 A1* 5/2009 Mitsuda et al. ............. 429/94

FOREIGN PATENT DOCUMENTS

| JP | 2000077091 A * | 3/2000 |
|---|---|---|
| JP | 2000-156240 | 6/2000 |
| JP | 2000-182573 | 6/2000 |
| JP | 2002-198102 | 7/2002 |
| JP | 2004-327066 | 11/2004 |
| JP | 2006-80072 | 3/2006 |
| JP | 2006-164956 | 6/2006 |
| JP | 2007-5069 | 1/2007 |
| JP | 2009-48966 | 3/2009 |
| JP | 2010-55887 | 3/2010 |

OTHER PUBLICATIONS

English language translation of JP 2000-182573.*
International Search Report in International Application No. PCT/JP2010/055407; Mailing Date: May 25, 2010.
Partial English language translation of JP 2000-18257, published Jun. 30, 2000.

* cited by examiner

LITHIUM ION SECONDARY BATTERY, VEHICLE, AND BATTERY MOUNTING DEVICE

CROSS-REFERENCE TO RELATED APPLICATIONS

This application is a national phase application of International Application No. PCT/JP2010/055407, filed Mar. 26, 2010, the contents of which are incorporated herein by reference.

TECHNICAL FIELD

The present invention relates to a lithium ion secondary battery including a flat wound electrode body of a flat transverse section including a strip-shaped positive electrode sheet and a strip-shaped negative electrode sheet that are wound about a winding axis while interposing strip-shaped separators therebetween, a vehicle and a battery mounting device, each using such a lithium ion secondary battery.

BACKGROUND ART

In recent years, lithium ion secondary batteries (hereinafter, also simply referred to as batteries) able to be charged and discharged are utilized as power sources for driving a hybrid electric vehicle and a portable electronic device such as a notebook-sized personal computer and a video camcorder.

One example of an electrode body of such a battery is a flat wound electrode body wound to be flat in transverse section about a winding axis. This electrode body includes a central portion located at a center of the transverse section in a long-side direction and end portions located respectively at both ends in the long-side direction.

In the lithium ion secondary battery, meanwhile, a positive electrode sheet and a negative electrode sheet constituting an electrode body will expand and contract in association with charge and discharge. Accordingly, the size or dimension of a battery case accommodating the electrode body changes. To suppress variations in battery performance due to such dimensional changes, in many cases, the central portion of the flat wound electrode body is compressed from outside of the battery case.

For instance, Patent Document 1 discloses a lithium secondary battery (a lithium ion secondary battery) configured such that an electrode group or assembly (a flat wound electrode body) is contained in a battery container (a battery case) having flat surface portions and side surface portions. In this lithium secondary battery, the thickness of each flat surface portion is designed to be larger than that of the side surface portions so that the flat surface portions of the battery container (the battery case) can press a flattened portion (a central portion) of the central portion of the electrode assembly (the flat wound electrode body).

Meanwhile, in a battery including an electrode assembly (a flat wound electrode body) described as a related art in Patent Document 1, (see FIG. 8 of Patent Document 1), the degree of strain on the flattened portion of the central portion (the central portion) of the electrode assembly is lower than that on curved portions (the end portions) located at both ends in the long-side direction of the transverse section of the electrode assembly. Accordingly, as shown in FIG. 8(b) of Patent Document 1, it is assumed that the electrode assembly may bulge inward. This is because a winding core of the electrode assembly is an air core and this electrode assembly is not fully compressed in a short-side direction of the transverse section, and thus no pressure is exerted on the flattened portion of this electrode assembly. The flattened portion with a relatively low strain is liable to generate gaps causing inward bulging than the curved portions.

On the other hand, in a battery described in embodiments of Patent Document 1 (see FIGS. 1 to 5 of Patent Document 1), with the use of a cylindrical winding core 6, the flattened portion of the central portion of the electrode assembly is pressed by the flat surface portions of the battery container (the battery case). Thus, the degree of strain on the flattened portion of the central portion becomes higher than other portions of the electrode assembly. Accordingly, the degree of strain between the flattened portion of the central portion of the electrode assembly and the curved portions are uniformized. As a result, it seems possible to prevent the generation of gaps in the electrode assembly.

RELATED ART DOCUMENTS

Patent Documents

Patent Document 1: JP 2000-182573A

DISCLOSURE OF THE INVENTION

Problems to be Solved by the Invention

However, in the battery described in the embodiment of Patent Document 1, a positive electrode sheet and others are wound around the cylindrical core once and then this is deformed into a non-right-circular cylindrical shape (a flat shape) to provide the electrode assembly. At that time, the circumferential length of the winding core remains unchanged before and after deformation and thus the circumferential length of the positive electrode sheet and others wound around the core also remains unchanged. No tensile force comes about in the positive electrode sheet and others in the long-side direction thereof. Accordingly, the positive electrode sheet, negative electrode sheet, and separators are not sufficiently in pressure contact with each other in the curved portions.

Therefore, in case the electrode assembly becomes abnormally overheated (e.g., an internal temperature of the battery is 150° C. or more) and the separators in the curved portions (the end portions) attempt to thermally contract in the winding axis direction (the width direction of the separators), the separators can easily thermally contract because the separators in the curved portions (the end portions) are not in sufficient pressure contact relation with the positive electrode sheet or the negative electrode sheet. Accordingly, in the curved portions (the end portions), the separators are partially absent between the positive electrode sheet and the negative electrode sheet, causing contact between the positive electrode sheet and the negative electrode sheet, resulting in short circuits.

The present invention has been made in view of the circumstances and has a purpose to provide a lithium ion secondary battery configured to prevent the occurrence of short circuits even in an abnormally overheated state. Further, another purpose is to provide a battery pack including a plurality of such lithium ion secondary batteries, a vehicle and a battery-pack mounting device, each being provided with this battery pack.

Means of Solving the Problems

One aspect of the invention provides a lithium ion secondary battery comprising: a flat wound electrode body of a flat transverse section, including a strip-shaped positive electrode sheet and a strip-shaped negative electrode sheet that are wound about a winding axis while interposing strip-shaped separators therebetween; and a battery case containing the flat wound electrode body, wherein the flat wound electrode body is configured so that a central portion located at a center in a long-side direction of the transverse section is pressed toward the winding axis in a short-side direction to have a more constricted shape than end portions in the long-side direction located respectively at both ends in the long-side direction, the end portions each include: an end-portion positive electrode sheet, an end-portion negative electrode sheet, and end-portion separators, each being curved to form the end portion, of the positive electrode sheet, the negative electrode sheet, and the separators; and a core member located more inward than the end-portion positive electrode sheet, the end-portion negative electrode sheet, and the end-portion separators, the core member including at least an outer surface located outside in the long-side direction that is a cylindrical surface that protrudes outward in the long-side direction and is parallel to the winding axis, and with tensile forces generated, by pressing of the central portion, in a central-portion positive electrode sheet, a central-portion negative electrode sheet, and central-portion separators, forming the central portion of the positive electrode sheet, the negative electrode sheet, and the separators, the end-portion positive electrode sheet, the end-portion negative electrode sheet, and the end-portion separators are placed in pressure contact with each other and press the outer surface of the core member.

In the above battery, the flat wound electrode body (hereinafter, also simply referred to as an electrode body) is configured such that, with the tensile forces generated by pressing of the central portion in the central-portion positive electrode sheet, the central-portion negative electrode sheet, and the central-portion separators, the end-portion positive electrode sheet, end-portion negative electrode sheet, and end-portion separators are in pressure contact with each other and press the outer surface of the core member. In the end portions, therefore, the end-portion separators are sandwiched and restrained between the end-portion positive electrode sheet and the end-portion negative electrode sheet. Accordingly, even when the end-portion separators attempt to thermally contract in the winding axis direction when the electrode body is abnormally overheated, this thermal contraction is prevented and thus the end-portion separators can be kept interposed between the end-portion positive electrode sheet and the end-portion negative electrode sheet. This makes it possible to prevent the generation of short circuits resulting from the thermal contraction of the end-portion separators in the winding axis direction. Thus, a reliable battery can be achieved.

The core member includes the outer surface located outside in the long-side direction of the transverse section of the electrode body, the outer surface being a cylindrical surface protruding outward in the long-side direction and extending parallel to the winding axis. This core member may be provided as for example two separate core members included in two end portions, and no core member is provided in the central portion. The core member may also be configured to also exist (e.g., integrally) in the central portion in addition to the end portions. In this case, the size of the core member in each end portion in the short-side direction is designed to be larger than that in the central portion in the short-side direction. The core member may be cylindrical (hollow) or solid.

In the aforementioned lithium ion secondary battery, preferably, the central portion does not include the core member and is configured so that the central-portion positive electrode sheet, the central-portion negative electrode sheet, and the central-portion separators laminated in contact with each other in the short-side direction are placed in pressure contact with each other in the short-side direction.

In the above battery, the central portion includes no core member, and the central-portion positive electrode sheet, central-portion negative electrode sheet, and central-portion separators are in pressure contact with each other. In the central portion, therefore, it is also possible to prevent short circuits between the central-portion positive electrode sheet and the central-portion negative electrode sheet resulting from thermal contraction of the central-portion separators and the size of the central portion of the electrode body in the short-side direction can be reduced. Thus, a compact battery can be achieved.

Alternatively, another aspect of the invention provides a vehicle mounted with one of the aforementioned lithium ion secondary batteries, wherein the vehicle uses electrical energy stored in the lithium ion secondary battery as a whole or a part of a power source.

Since the above vehicle includes the lithium ion secondary battery configured to prevent short circuits, this vehicle can be used stably.

The above vehicle may be any types of vehicles as long as they are designed to use electric energy from the battery as the whole of or part of the driving power source. Examples of such vehicles include electric vehicles, hybrid electric vehicles, plug-in hybrid vehicles, hybrid railroad vehicles, forklifts, electric wheelchairs, electric bicycles and electric scooters.

Alternatively, another aspect of the invention provides a battery mounting device mounted with one of the above lithium ion secondary batteries, wherein the device uses electrical energy stored in the lithium ion secondary battery as a whole or a part of a drive energy source.

Since the above battery mounting device is mounted with the lithium ion secondary battery configured to prevent short circuits, this battery mounting device can be used stably.

The battery mounting device may be any types of devices as long as they have a lithium ion secondary battery and utilize this battery as the whole of or part of the energy source. Examples of such devices include various battery-driven household electric appliances; office equipment, and industrial equipment such as personal computers, cellular phones, battery-driven electric tools, and permanent power supply systems.

MODE FOR CARRYING OUT THE INVENTION

First Embodiment

Figure 1:
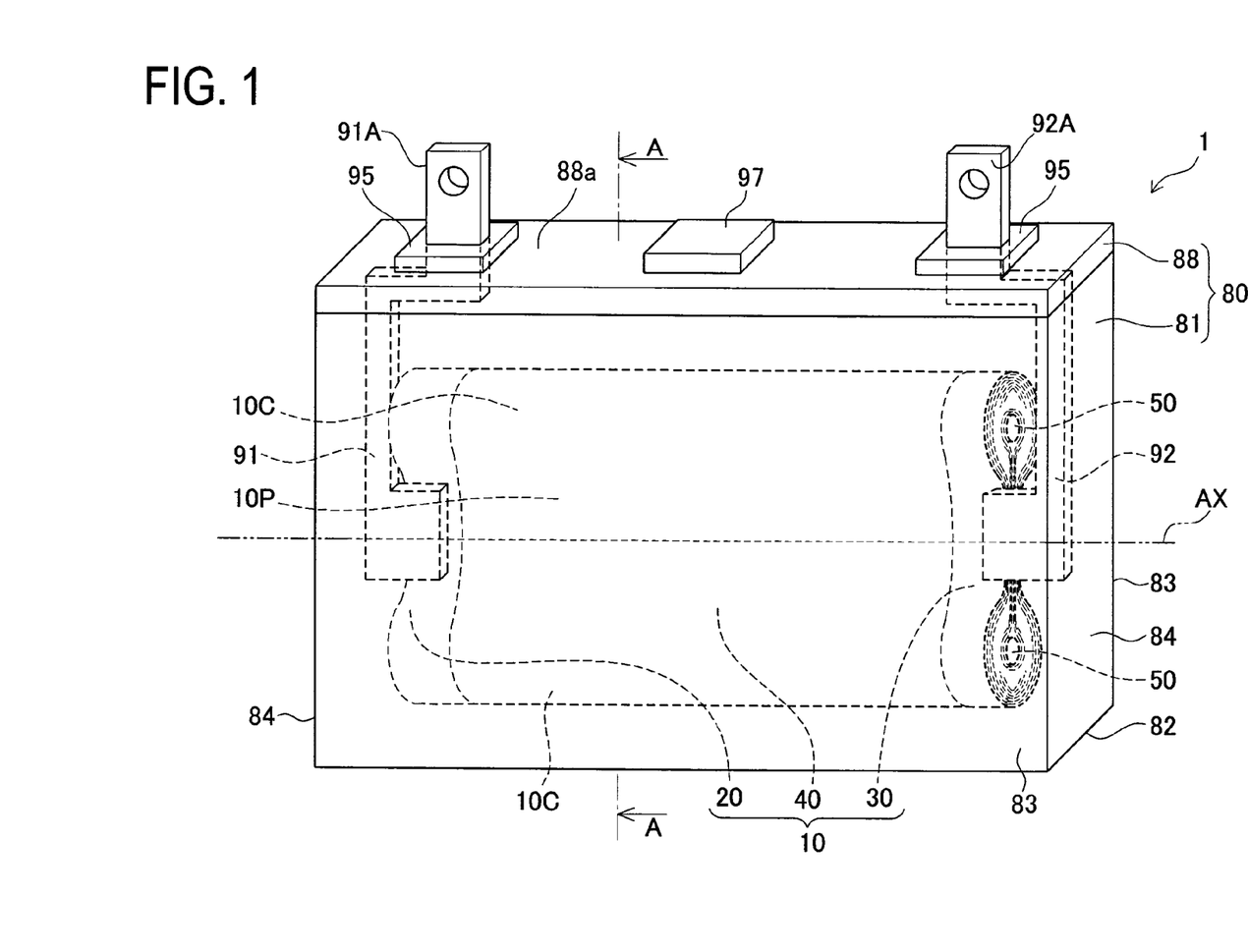
FIG. 1 is a perspective view of a battery in a first embodiment.

A detailed description of a battery 1 in a first embodiment will now be given referring to the accompanying drawings. FIG. 1 is a perspective view of the battery 1 and FIG. 2 is a cross-sectional view (A-A section in FIG. 1) of the battery 1.

Figure 2:
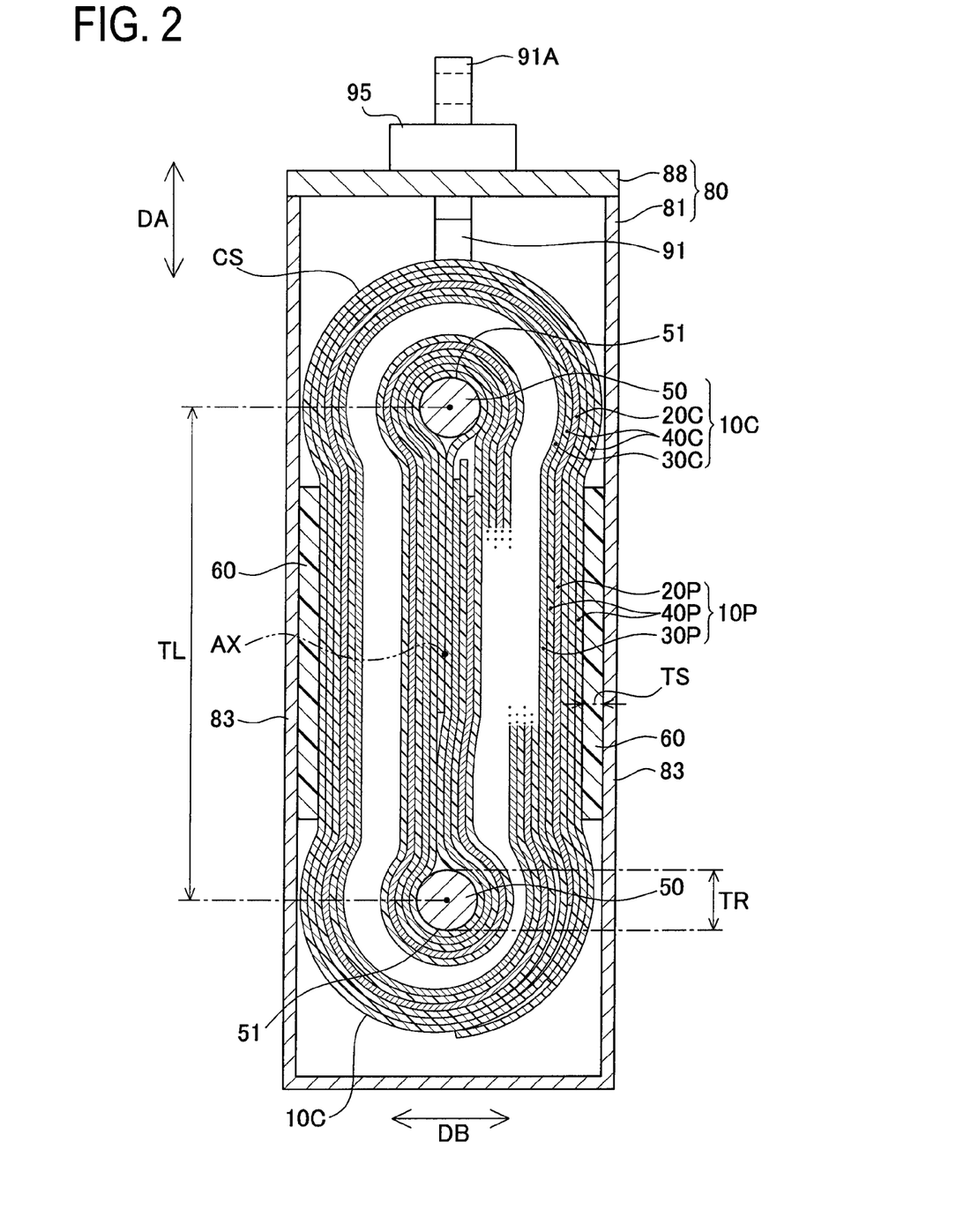
FIG. 2 is an end view of the battery (along a line A-A in FIG. 1) in the first embodiment.

This battery 1 is a lithium ion secondary battery provided with a flat wound electrode body 10 including a positive electrode sheet 20, a negative electrode sheet 30, and separators 40, each of which has a strip shape and which are wound about a winding axis AX, and having a flat transverse cross-section CS, and a battery case 80 containing this electrode body 10 (see FIGS. 1 and 2). Further, this battery 1 includes two resin spacers 60 respectively between the electrode body 10 (a central portion 10P mentioned later) and first walls 83 (mentioned later) of the battery case 80 (see FIG. 2).

This battery 1 liquid-tightly contains an electrolyte (not shown) prepared by adding 1 mol/l of a dissolved substance (LiPF$_6$) to a mixed organic solvent of ethylene carbonate (EC), dimethyl carbonate (DMC), and ethyl methyl carbonate (EMC) (a volume ratio is EC:DMC:EMC=3:3:4).

The battery case 80 of the battery 1 includes a case body 81 and a closing lid 88, each of which is made of aluminum. Between this battery case 80 and the electrode body 10, an insulation resin film (not shown) folded like a box is interposed.

The closing lid 88 has a rectangular plate-like shape and is welded to the case body 81 to close the opening of the case body 81. A positive terminal portion 91A and a negative terminal portion 92A located respectively at distal ends of a positive current collector 91 and a negative current collector 92 each connected to the electrode body 10 are placed to go through the lid 88 and protrude from an upper surface 88a in FIG. 1. Between the positive terminal portion 91A and the lid 88 and between the negative terminal portion 92A and the lid 88, insulating members 95 made of insulating resin are respectively interposed for insulation. A rectangular plate-like safety valve 97 is also sealingly attached to the lid 88.

The case body 81 has a bottom-closed rectangular box shape, specifically, includes a rectangular flat plate-like bottom wall 82 opposite the lid 88, and case walls (first case walls 83 and second case walls 84 which will be mentioned later) each extending from four edges of the bottom wall 82 in a vertical direction of the bottom wall 82 (see FIG. 1). These case walls include two first case walls 83 each having a flat plate shape and being located parallel to the winding axis AX of the electrode body 10 and two second case walls 84 each having a flat plate shape and being located perpendicular to the winding axis AX.

The two first case walls 83 are arranged in parallel to each other and to hold therebetween the central portion 10P (mentioned later) of the electrode body 10 through the spacers 60 (see FIG. 2).

The electrode body 10 is of a wound configuration with a flat transverse section CS as shown in FIGS. 1 and 2 in which the strip-shaped positive electrode sheet 20 and the strip-shaped negative electrode sheet 30 interposing therebetween the strip-shaped separators 40 are wound around the winding axis AX.

Figure 3:
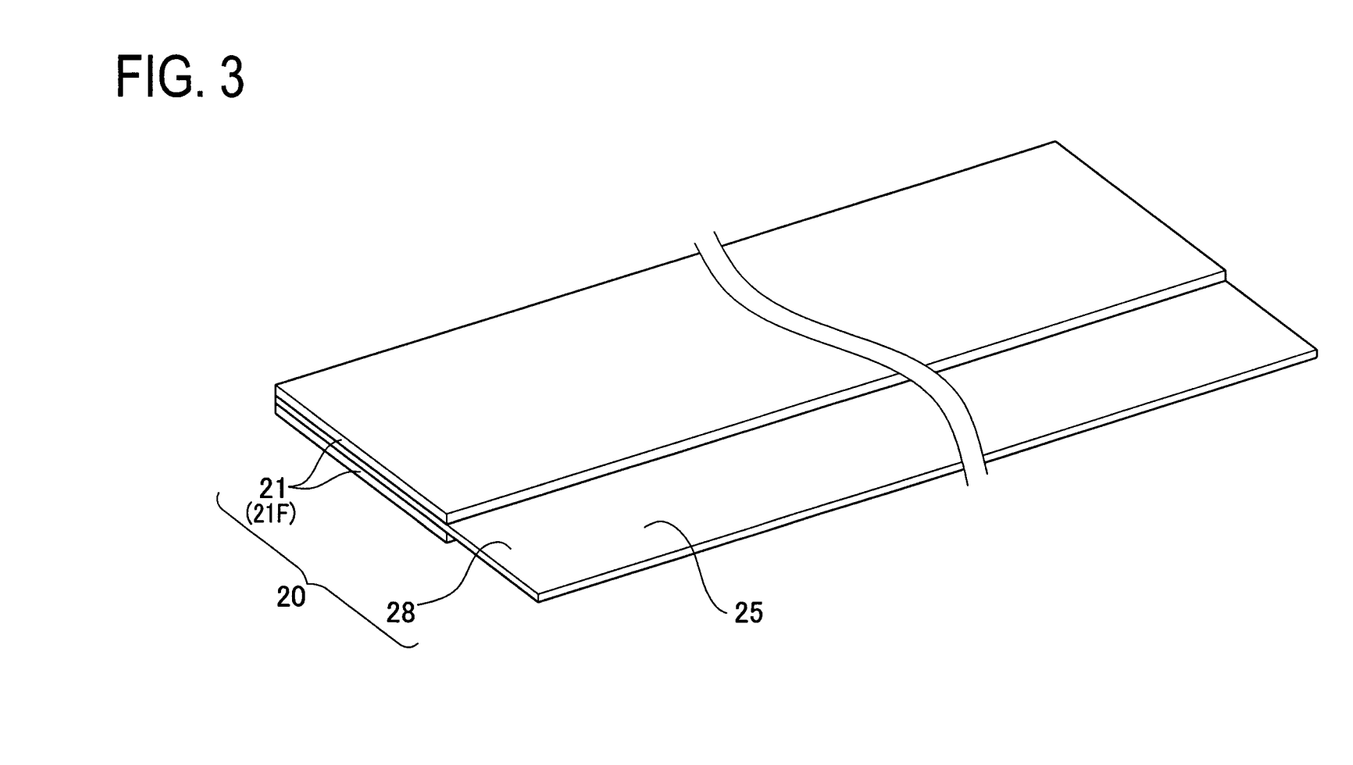
FIG. 3 is a perspective view of a positive electrode sheet in the first embodiment.

Of this electrode body 10, the positive electrode sheet 20 formed of a thin strip sheet includes a strip-shaped positive current collecting foil 28 made of aluminum and positive active material layers 21 formed on both main surfaces of this foil 28 (see FIG. 3). This foil 28 includes an exposed foil portion 25 in which the aluminum is exposed.

Figure 4:
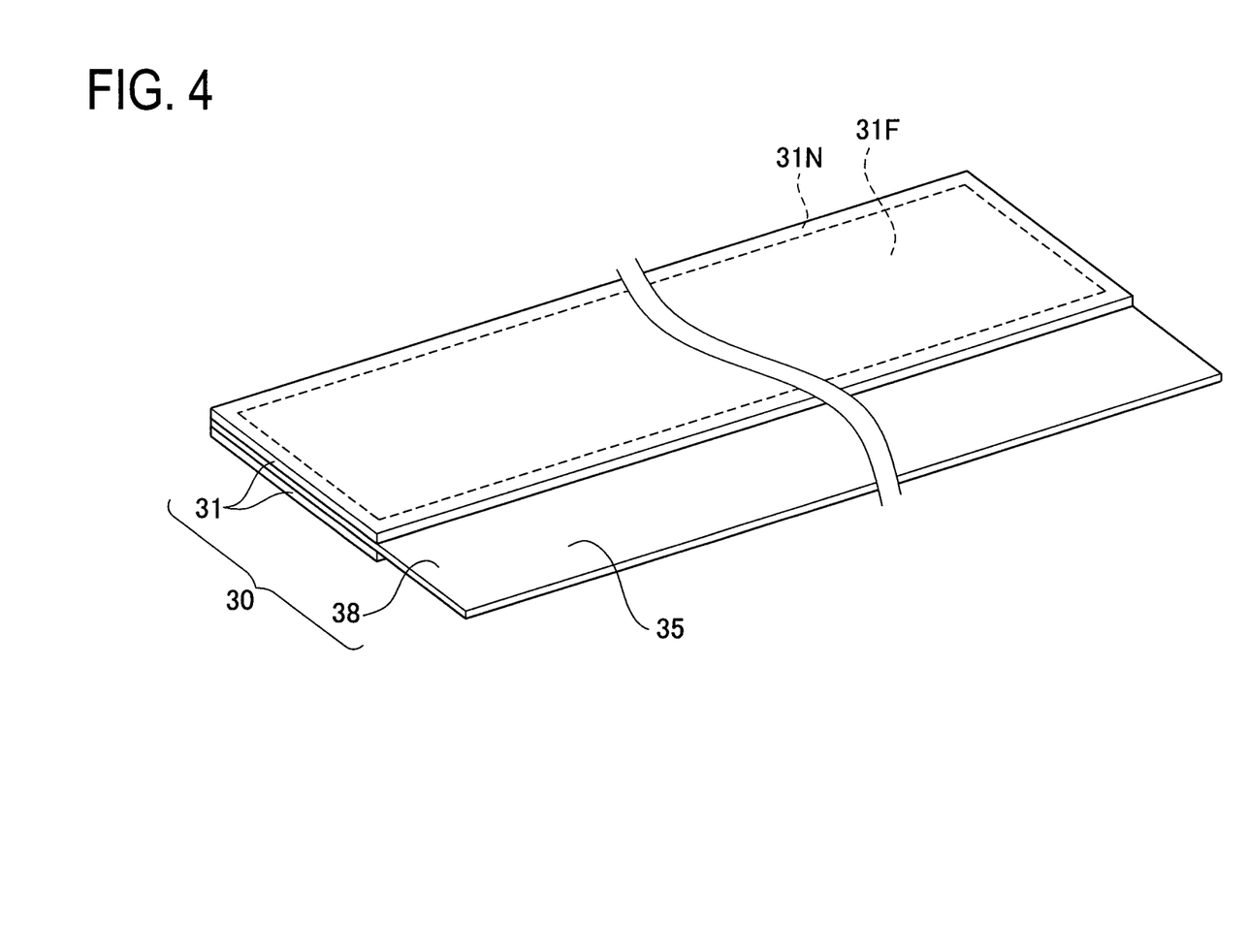
FIG. 4 is a perspective view of a negative electrode sheet in the first embodiment.

On the other hand, the negative electrode sheet 30 formed of a thin strip sheet includes a strip-shaped negative current collecting foil 38 made of copper and negative active material layers 31 formed on both main surfaces of this foil 38 (see FIG. 4). This foil 38 includes an exposed foil portion 35 in which the copper is exposed.

The electrode body 10 is configured such that the area of a plane formed with the negative active material layer 31 is set to be larger than the positive active material layer 21 in order to prevent lithium ions releasing from the positive active material layers 21 from concentrating on the outer circumference of the negative active material layers 31, leading to deposition of metallic lithium, during use of the battery 1. Accordingly, the active material layers 21 of the positive electrode sheet 20 are wholly positive-electrode facing portions 21F facing the negative active material layers 31, while the negative active material layers 31 of the negative electrode sheet 30 each include a negative-electrode facing portion 31F facing the positive active material layer 21 (the positive facing portion 21F) and a negative-electrode non-facing portion 31N that does not face the positive active material layer 21 (the positive facing portion 21F) (see FIG. 4). Each negative non-facing portion 31N is located outside the corresponding negative-electrode facing portion 31F as shown in FIG. 4.

The strip-shaped separators 40 are of a three-layer configuration in which a polyethylene layer is sandwiched between two polypropylene layers. Each of the separators 40 is wholly interposed between the facing portion 21F (the positive active material layer 21) of the positive electrode sheet 20 and the facing portion 31F of the negative electrode sheet 30 to prevent the occurrence of short circuits between the positive electrode sheet 20 and the negative electrode sheet 30.

Figure 5:
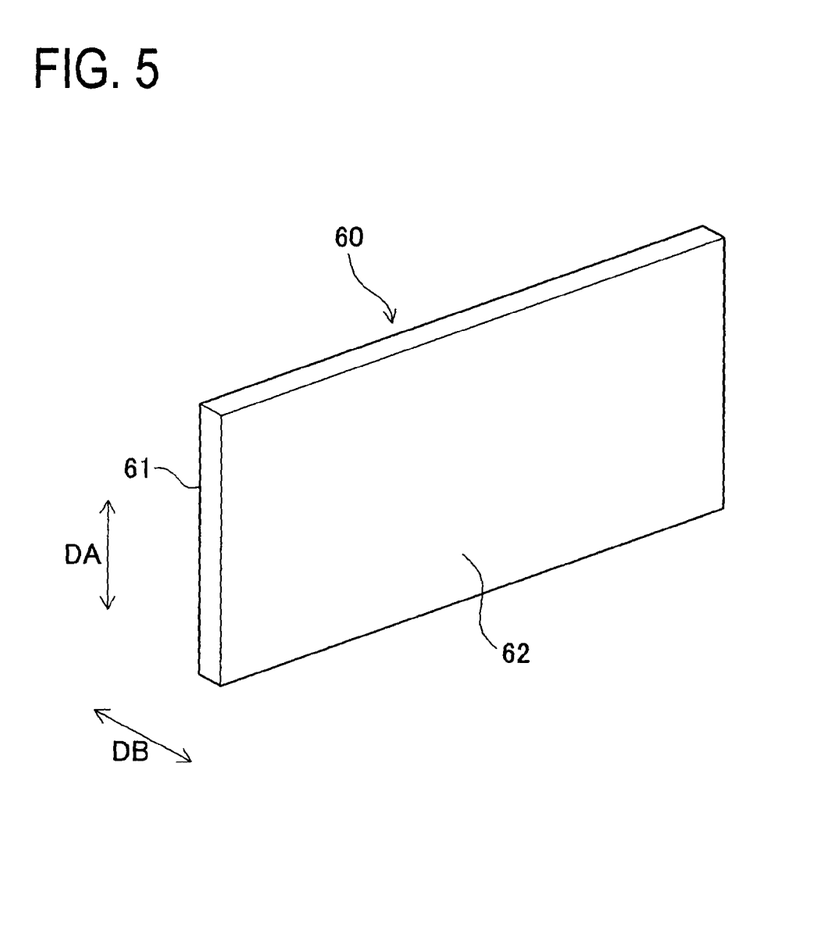
FIG. 5 is a perspective view of a spacer in the first embodiment.

Each of the spacers 60 made of resin in a rectangular flat plate shape includes a first main surface 61 and a second main surface 62 both of which are flat and parallel to each other (see FIG. 5). As shown in FIG. 2, each spacer 60 is interposed between the battery case 80 and the electrode body 10 so that the first main surface 61 tightly contacts with the first case wall 83 of the case 80 and the second main surface 62 tightly contacts with the central portion 10P (mentioned later) of the electrode body 10. Thickness TS of each spacer 60 (i.e., thickness between the first main surface 61 and the second main surface 62) is 1.5 mm.

The above electrode body 10 includes the central portion 10P located at a center of the transverse section CS in a long-side direction DA and two end portions 10C located respectively on both ends of the transverse section CS of the electrode body 10 in the long-side direction DA (see FIG. 2). This electrode body 10 has such a shape that the central portion 10P is pressed toward the winding axis AX in a short-side direction DB so that the central portion 10P is more constricted than the end portions 10C.

The central portion 10P consists of the central-portion positive electrode sheet 20P, the central-portion negative electrode sheet 30P, and the central-portion separators 40P, forming the central portion 10P, of the positive electrode sheet 20, negative electrode sheet 30, and separators 40. As shown in FIG. 2, they are laminated in contact with each other in the short-side direction DB. On the other hand, each of the two end portions 10C includes the end-portion positive electrode sheet 20C, the end-portion negative electrode sheet 30C, and the end-portion separators 40C, which are curved to form the end portion 10C, of the positive electrode sheet 20, negative electrode sheet 30, and separators 40, and a core member 50 located more inward than those end-portion positive electrode sheet 20C, end-portion negative electrode sheet 30C, and end-portion separators 40C. The core members 50 are each made of aluminum in a solid right-circular cylindrical shape. As shown in FIG. 2, the outer surface 51 of each core member 50 located on the outer sides in the long-side direction DA is of a cylindrical surface protruding outward in the long-side direction DA and parallel to the winding axis AX. In this embodiment, the diameter TR of each core member 50 is 3.0 mm and a center-to-center distance TL between the two core members 50 shown in FIG. 2 is 39 mm.

Since the central portion 10P is pressed toward the winding axis AX in the short-side direction DB and the core members 50 are placed in the above dimensional relationship, in the battery 1 in the first embodiment, tensile forces are generated in the central-portion positive electrode sheet 20P, central-portion negative electrode sheet 30P, and central-portion separators 40P.

Figure 6:
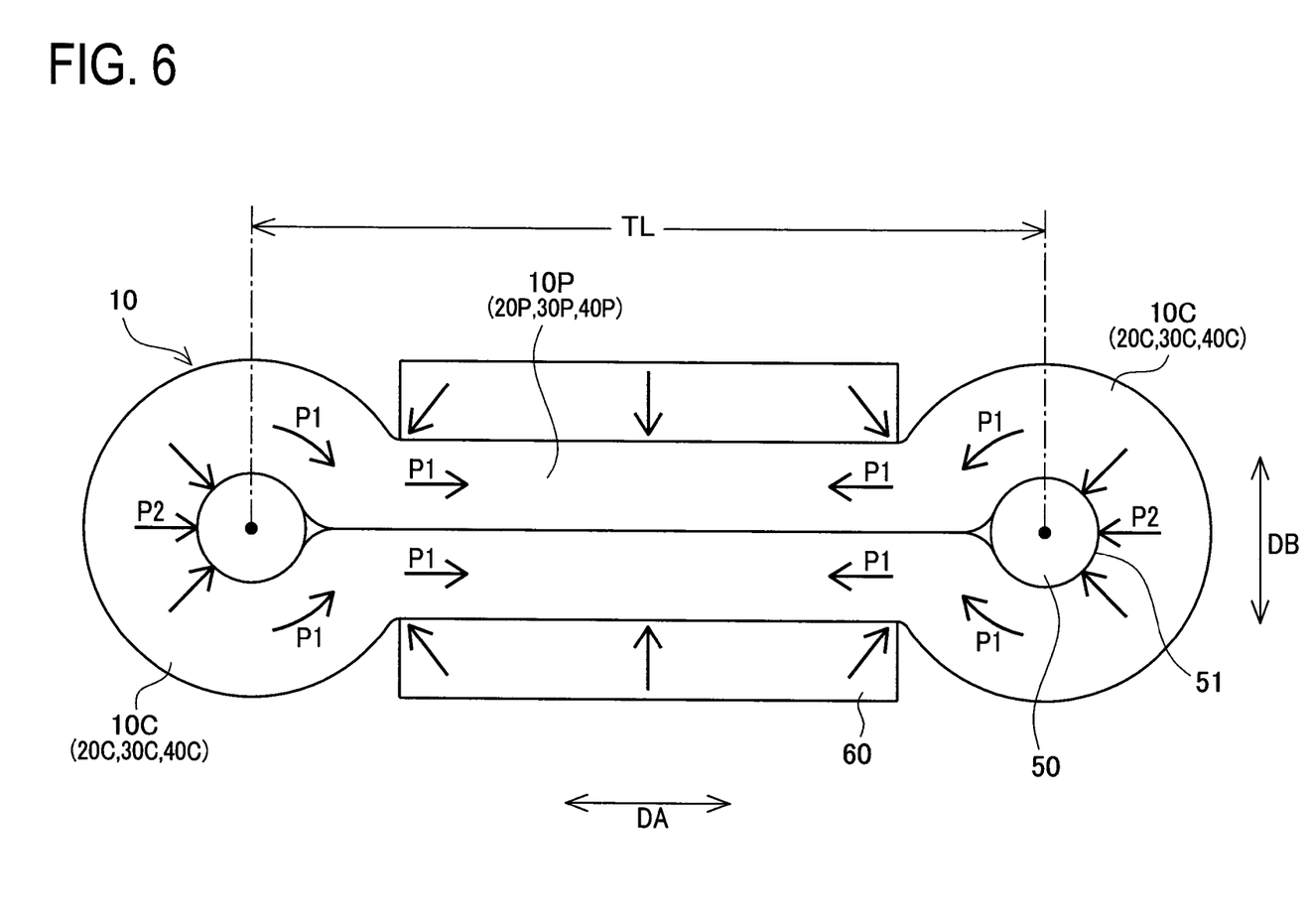
FIG. 6 is an explanatory view of an electrode body in the first embodiment.

Specifically, as shown in FIG. 6, the central portion 10P is pressed toward the winding axis AX in the short-side direction DB by the two spacers 60. Even when the central portion 10P is pressed as above, the circumferential length of the wound body 10 remains unchanged. The pressed central portion 10P pulls or stretches the two end portions 10C. In other words, the central-portion positive electrode sheet 20P pulls the end-portion positive electrode sheet 20C, the central-portion negative electrode sheet 30P pulls the end-portion negative electrode sheet 30C, and the central-portion separators 40P pull the end-portion separators 40C, respectively. Accordingly, the two end portions 10C attempt to move, together with the core members 50, in a direction that comes close to each other (inward the wound body 10) in the long-side direction DA.

Therefore, the two spacers 60 are placed respectively outside the central portion 10P and between the two end portions 10C when seen in the long-side direction DA. Accordingly, inward movement of the end portions 10C is restricted by the spacers 60. The thickness and the width of the spacers 60 are adjusted as above to place the two end portions 10C respectively so that predetermined tensile forces P1 are exerted between the central portion 10P and the end portions 10C. In this electrode body 10, the tensile forces P1 are generated in the central-portion positive electrode sheet 20P, the central-portion negative electrode sheet 30P, and the central-portion separators 40P, respectively.

In association with this, the tensile forces are also generated in the end-portion positive electrode sheet 20C, end-portion negative electrode sheet 30C, and end-portion separators 40C, respectively. In these end-portion positive electrode sheet 20C, end-portion negative electrode sheet 30C, and end-portion separators 40C, therefore, pressing forces P2 that press the outer surfaces 51 of the core members 50 located inside thereof are generated (see FIG. 6). In each end portion 10C, accordingly, the end-portion positive electrode sheet 20C, end-portion negative electrode sheet 30C, and end-portion separators 40C are held in pressure contact with each other.

Meanwhile, the inventors investigated whether or not the positive electrode sheet 20 and the negative electrode sheet 30 are short-circuited in the electrode body 10 of the battery 1 in the first embodiment when the battery 1 falls into an abnormally overheated state.

To be concrete, the above battery 1 was subjected to a heating test. In this heating test, firstly, with the first case walls 83 of the battery case 80 pinched by two metal end plates, a battery 1 (whose state of charge has been adjusted to an SOC of 80%) is put in a constant temperature bath. The internal temperature of the bath was increased to 160° C. at a speed of 5° C./min. Then, when the bath temperature reached 160° C., this temperature was kept for 30 minutes. The battery temperature and a terminal voltage of the battery 1 during testing were measured separately.

In this heating test, the number of test pieces was set to 5 (n=5).

As a comparative example, a comparative battery C1 identical to the battery 1 excepting that an electrode body does not include the core members 50 and the spacers 60 and has an elliptic transverse cross-section and is contained in a battery case having a smaller width than the battery case of the battery 1 so that a central portion of this electrode body is compressed from outside. This comparative battery C1 was also subjected to the heating test. As to the comparative battery C1, as with the battery 1, the number of test pieces in the heating test was set to 5 (n=5).

As a result of the above heating test, of the comparative batteries C1, three test pieces were remarkably decreased in terminal voltage after the heating test (the terminal voltage after the test was almost 0V). This reveals that short circuits occurred in the comparative batteries C1 in the heating test. In those three test pieces, the battery temperature during testing rose to about 230° C., higher than a maximum value (160° C.) of the bath temperature of the temperature constant bath. This seems because short circuits have occurred during the test and heat generated due to the short circuits caused a rise in battery temperature more than the bath temperature. The generation of short circuits is confirmed.

As to the battery 1, on the other hand, a remarkable decrease in terminal voltage is not found in every test piece during the heating test. The battery temperature during the test changed in a similar manner to the temperature of the temperature constant bath. The maximum temperature was 160° C. This result reveals that no short circuit has occurred in the battery 1 in the heating test.

Furthermore, the inventors prepared test batteries T2, T3, and T4 as examples and carried out a heating test in a similar manner to the heating test on the battery 1. As to those test batteries T2 to T4, as with the battery 1, the number of test pieces in the heating test was set to 5 (n=5).

The test battery T2 was made identical to the battery 1 excepting that the core diameter TR was changed to 5.0 mm, the center-to-center distance TL between two core members was changed to 36 mm, and the spacer thickness TS was changed to 2.5 mm.

Figure 7:
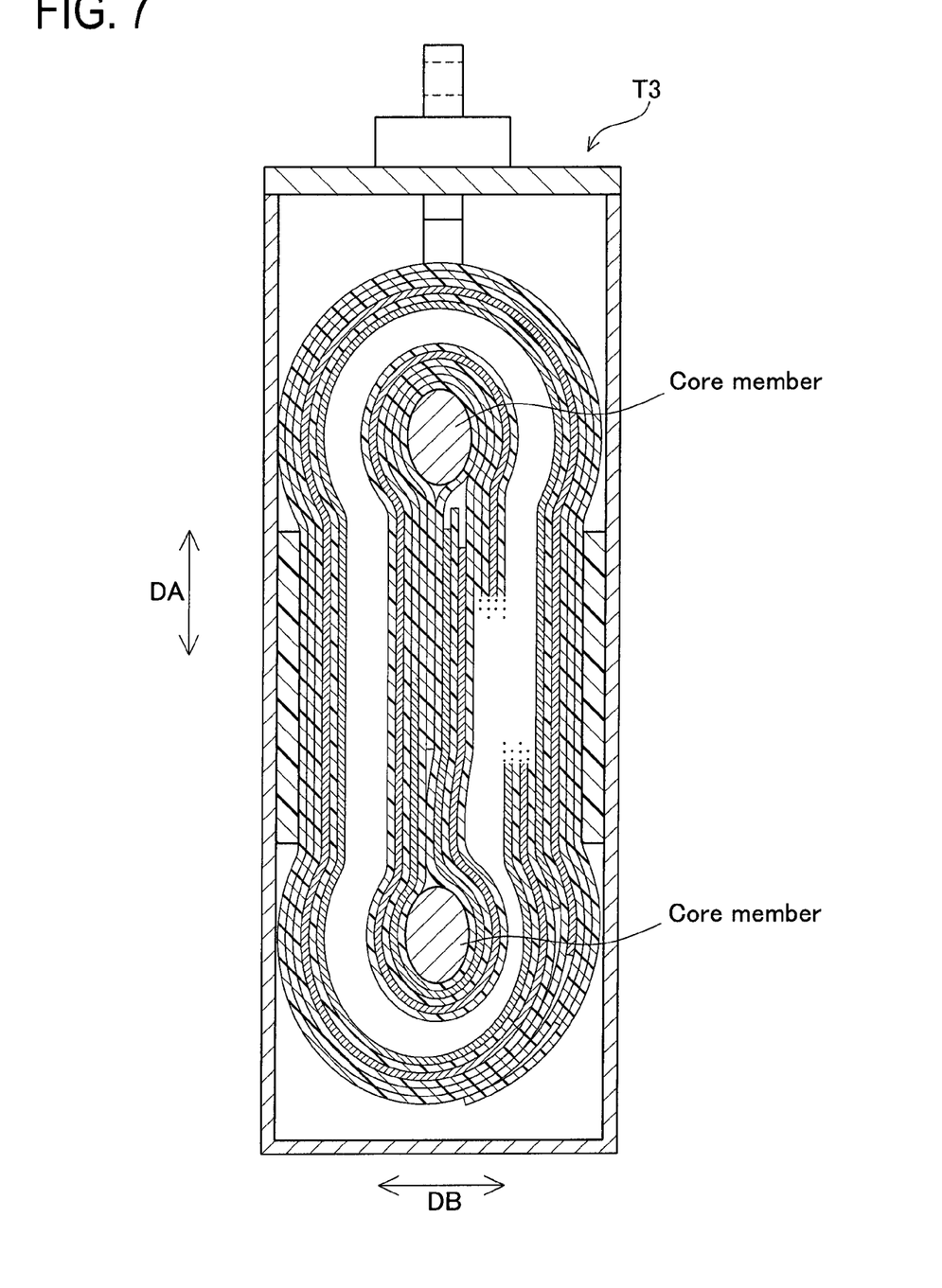
FIG. 7 is an explanatory view of a test battery T3.

The test battery T3 was made identical to the battery 1 excepting the use of core members each having an elliptic cylindrical shape (a long side of 5 mm and a short side of 3 mm) (see FIG. 7).

The test battery T4 was different only in the material of core members from the test battery T2, that is, identical to the battery 1 excepting that the core diameter TR was changed to 5.0 mm, the center-to-center distance TL between two core members was changed to 36 mm, and the spacer thickness TS was changed to 2.5 mm, and the core material was polypropylene.

As a result of the above heating test, as to the test batteries T2 to T4, any test pieces did not exhibit a remarkable decrease in terminal voltage during the heating test as with the battery 1. The battery temperature varied during the test in a similar manner to the temperature of the temperature constant bath and the maximum value was 160° C. From those results, it is found that no short circuits occurred in the test batteries T2 to T4 in the heating test, as with the battery 1.

In the battery 1 in the first embodiment, as explained above, the electrode body 10 is configured so that, with tensile forces (P1 in FIG. 6) generated in the central-portion positive electrode sheet 20P, central-portion negative electrode sheet 30P, and central-portion separators 40P when the central portion 10P is pressed, the end-portion positive electrode sheet 20C, end-portion negative electrode sheet 30C, and end-portion separators 40C are placed in pressure contact with each other and press the outer surfaces 51 of the core members 50 (the pressing forces P2 in FIG. 6). Therefore, in each end portion 10C, the end-portion separators 40C are sandwiched and restricted between the end-portion positive electrode sheet 20C and the end-portion negative electrode sheet 30C. Even when the end-portion separators 40C attempt to thermally contract in the winding axis AX direction when the electrode body 10 reaches an abnormal overheated state, the thermal contraction can be prevented, thereby allowing the end-portion separators 40C to continuously exist between the end-portion positive electrode sheet 20C and the end-portion negative electrode sheet 30C. This makes it possible to prevent the occurrence of short circuits resulting from the thermal contraction of the end-portion separators 40C in the winding axis AX direction. Thus, the battery 1 can be made reliable.

In this battery 1, the central portion 10P does not include the core members 50 and includes the central-portion positive electrode sheet 20P, central-portion negative electrode sheet 30P, and central-portion separators 40P so that they are in pressure contact with each other. Accordingly, in this central portion 10P, it is also possible to prevent short circuits between the central-portion positive electrode sheet 20P and the central-portion negative electrode sheet 30P caused by thermal contraction of the central-portion separators 40P. Further, the central portion 10P of the electrode body 10 can be reduced in size in the short-side direction DB. The battery 1 can therefore be made compact.

A method of manufacturing the battery 1 in the first embodiment will be explained below.

The positive electrode sheet 20 is first produced. Specifically, a paste (not shown) prepared by mixing positive active material particles, a binder, and a conductive agent in a solvent is applied on both main surfaces of the strip-shaped positive current collecting foil 28 and then the paste is dried.

With a roll press not shown, further, the dried paste on each main surface of the positive current collecting foil 28 is compressed. The positive electrode sheet 20 formed with the positive active material layers 21 is thus produced (see FIG. 3).

On the other hand, the negative electrode sheet 30 is produced. Specifically, a paste (not shown) prepared by mixing negative active material particles and a binder in a solvent is applied on both main surfaces of the strip-shaped negative current collecting foil 38 and then the paste is dried.

With a roll press not shown, further, the dried paste on each main surface of the negative current collecting foil 38 is compressed. The negative electrode sheet 30 formed with the negative active material layers 31 is thus produced (see FIG. 4).

The positive electrode sheet 20 and the negative electrode sheet 30 produced as above are wound together with the aforementioned two separators 40 to form the electrode body 10. In other words, the separator 40, the negative electrode sheet 30, the separator 40, and the positive electrode sheet 20 laminated in this order are wound around the winding axis AX toward the radial outside.

The separator 40 is first wound by several turns around a winding core member (not shown) having a cylindrical shape with an outer diameter of 30 mm. On the outside of this separator 40 in the radial direction, the negative electrode sheet 30 is placed. The other separator 40 is further placed on the radial outside of the negative electrode sheet 30, and then the positive electrode sheet 20 is arranged on the radial outside of this separator 40. Those two separators 40, the positive electrode sheet 20, and the negative electrode sheet 30 are wound around the winding core member. The positive electrode sheet 20 and the negative electrode sheet 30 are arranged so that the positive facing portions 21F of the positive active material layers 21 face the negative facing portions 31F of the active material layers 31 respectively.

After the positive electrode sheet 20, negative electrode sheet 30, and separators 40 are wound around the winding core member as above, this core member is removed from the center of a wound body. Instead thereof, two core members 50 are inserted in the wound body and this wound body is pressed or flattened to place the core members 50 at both ends of the transverse section CS in the long-side direction DA. The electrode body 10 thus wound to have the flat transverse section CS is manufactured (see FIGS. 1 and 2).

Thereafter, in the central portion 10P, the positive current collector 91 is welded to the exposed foil portion 25 of the positive electrode sheet 20 and the negative current collector 92 is welded to the exposed foil portion 35 of the negative electrode sheet 30. The electrode body 10 connected to the positive current collector 91 and the negative current collector 92 is inserted in the case body 81. The aforementioned electrolyte is poured therein and then the case body 81 is sealed with the closing lid 88 by welding. The battery 1 is thus completed (see FIGS. 1 and 2).

Second Embodiment

Figure 8:
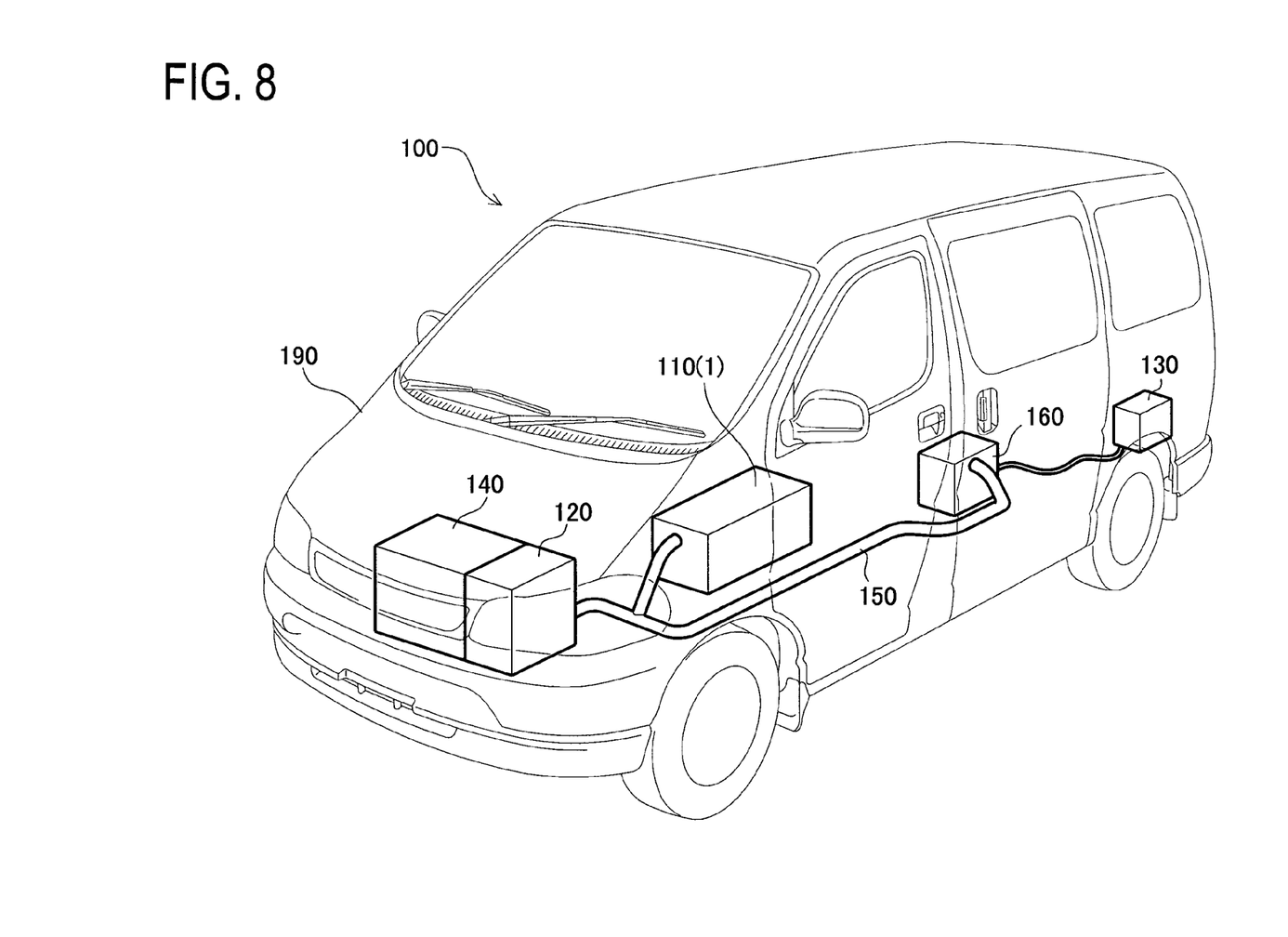
FIG. 8 is an explanatory view of a vehicle in a second embodiment.

A vehicle 100 in a second embodiment is mounted with a battery pack 110 including a plurality of the batteries 1 mentioned above. Specifically, as shown in FIG. 8, the vehicle 100 is a hybrid electric vehicle that is driven by an engine 140, a front motor 120, and a rear motor 130 in combination. This vehicle 100 has a vehicle body 190, the engine 140, the front motor 120 attached thereto, the rear motor 130, a cable 150, an inverter 160, and the battery pack 110 having a rectangular box shape. The plurality of batteries 1 in the battery pack 110 are stacked by interposing plate-like ventilation members (not shown) having ventilation paths parallel to the first case walls 83 individually between the adjacent batteries 1. On both end sides of the batteries 1 in a stack direction, two end plates (not shown) that hold the batteries 1 therebetween are placed. In each battery 1, accordingly, the central portion 10P is compressed via the first case walls 83 and the spacers 60 (see FIGS. 2 and 6).

Since the vehicle 100 in the second embodiment is mounted with the batteries 1 configured to prevent short circuits, the vehicle 100 can be used stably.

Third Embodiment

Figure 9:
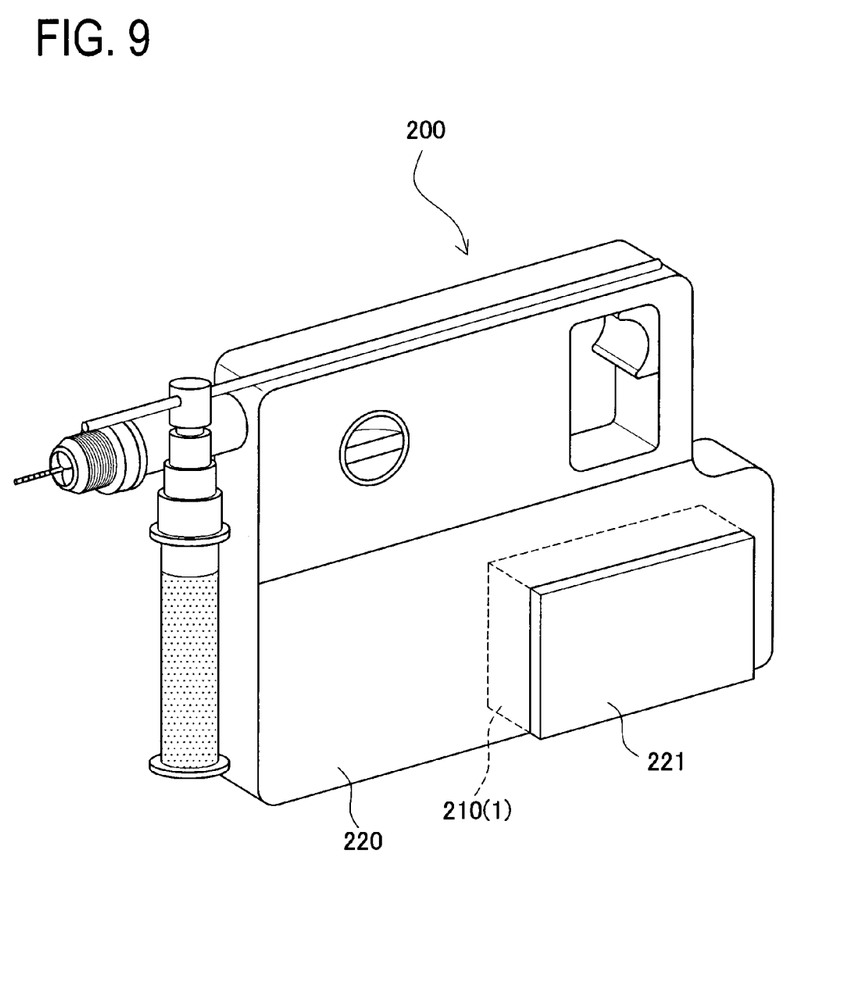
FIG. 9 is an explanatory view of a battery mounting device in a third embodiment.

A hammer drill 200 in a third embodiment is mounted with a battery pack 210 including a plurality of the aforementioned batteries 1 and is a battery mounting device having a battery pack 210 and a body 220 as shown in FIG. 9. The battery pack 210 is removably contained in a bottom part 221 of the body 220 of the hammer drill 200. The batteries 1 in the battery pack 210 are stacked so that the first case walls 83 of adjacent batteries 1 are in close contact with each other. On both end sides of the batteries 1 in a stack direction, two end plates (not shown) that hold the batteries 1 therebetween are placed. In each battery 1, accordingly, the central portion 10P is compressed via the first case walls 83 and the spacers 60 (see FIGS. 2 and 6).

Since the hammer drill 200 in the third embodiment is mounted with the batteries configured to prevent short circuits, the hammer drill 200 can be used stably.

The present invention is explained above in the first to third embodiments but it not limited thereto. The present invention may be embodied in other specific forms without departing from the essential characteristics thereof.

Figure 10:
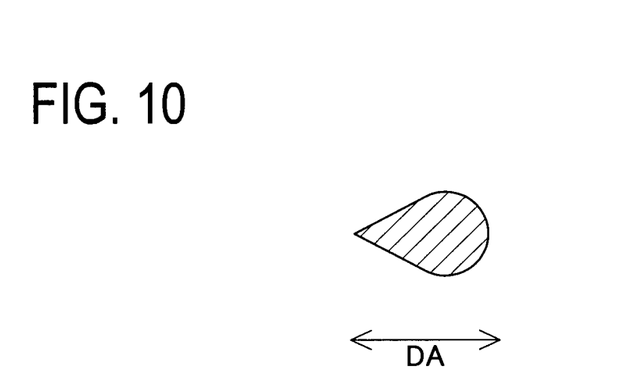
FIG. 10 is a cross-sectional view of a core member.
Figure 11:
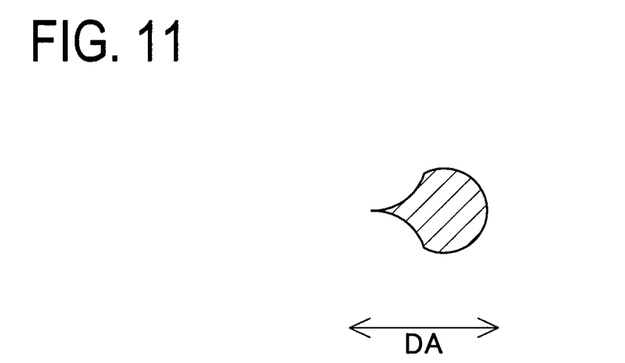
FIG. 11 is a cross-sectional view of another core member.

For instance, although the transverse section of each core member 50 is right-circular in the first embodiment, it may be elliptic as shown in the test battery T3 (see FIG. 7). Other shapes may also be adopted such as a shape whose transverse section is semi-circular in one side and isosceles triangular in the other side (see FIG. 10) or a shape whose transverse section is defined by a combination of a semi-circular shape and two curved lines (see FIG. 11). In those cases, the core members 50 are arranged in the end portions so that the outer surfaces located on the outer sides in the long-side direction DA of the transverse section of the electrode body protrude outward in the long-side direction DA to form cylindrical surfaces parallel to the winding axis.

Figure 12:
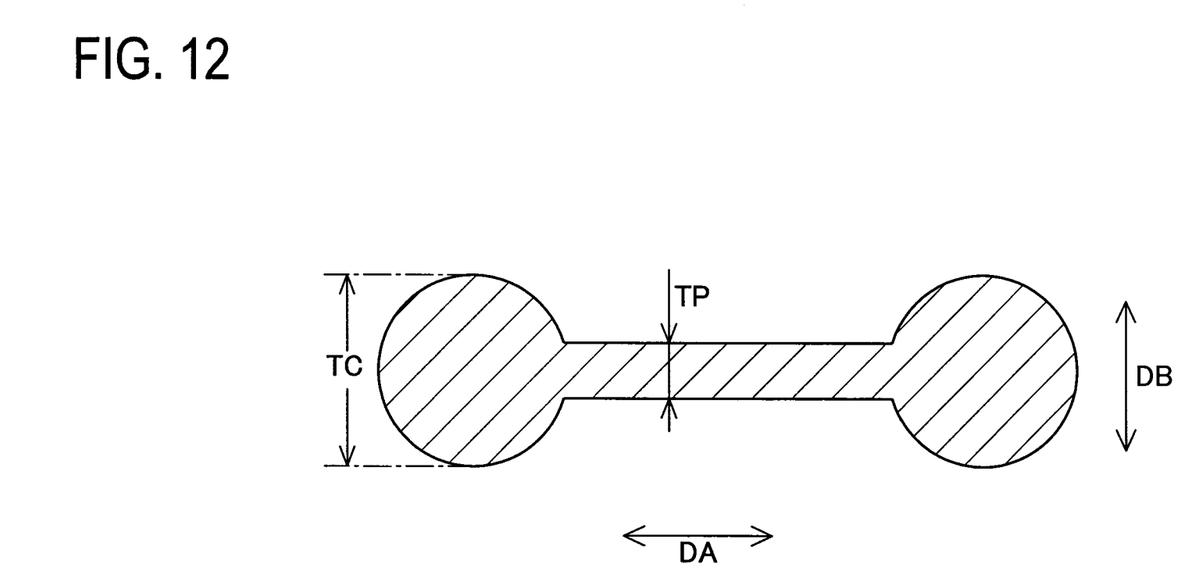
FIG. 12 is a cross-sectional view of another core member.

For instance, a core member configured to also exist (e.g., integrally) in the central portion in addition to the end portions may also be used (see FIG. 12). This core member is designed so that a size TC of a portion located in each end portion in the short-side direction DB is larger than a size TP of a portion located in the central portion in the short-side direction DB (TC>TP).

Figure 13:
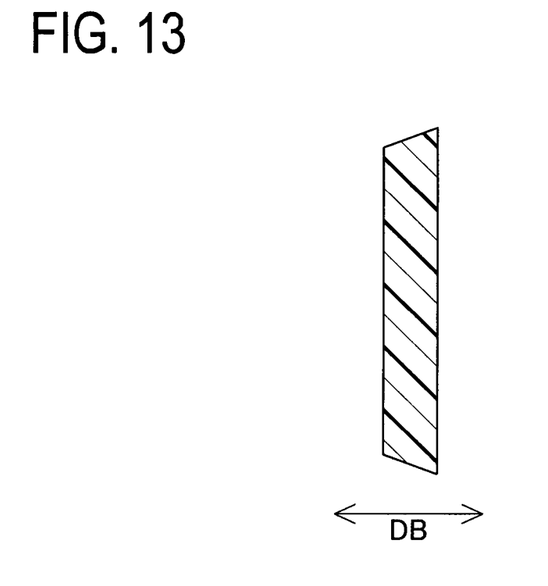
FIG. 13 is a cross-sectional view of a spacer.
Figure 14:
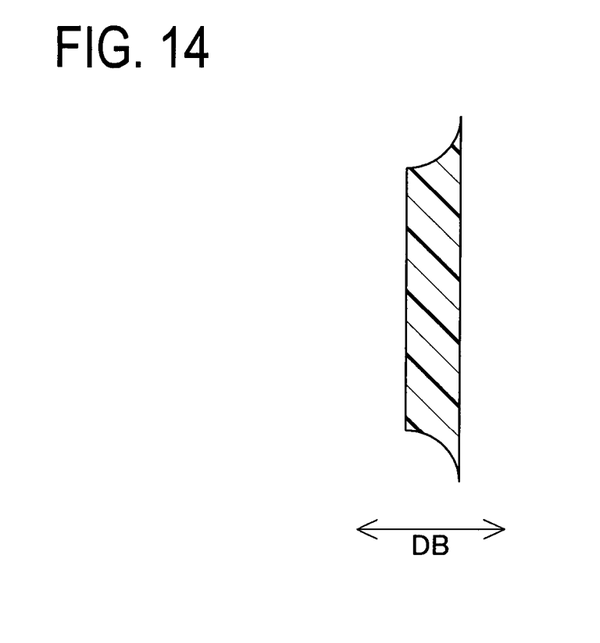
FIG. 14 is a cross-sectional view of another spacer.

Further, although the transverse section of each spacer 60 in the first embodiment has a rectangular shape, for example, it may be of a trapezoidal shape (see FIG. 13) or a shape with concave short sides curved in an arc (see FIG. 14).

DESCRIPTION OF THE REFERENCE SIGNS

1 Battery (Lithium ion secondary battery)
10 Electrode body (Flat wound electrode body)
10C End portion (of Electrode body)
10P Central portion (of Electrode body)
20 Positive electrode sheet
20C End-portion positive electrode sheet
20P Central-portion positive electrode sheet
30 Negative electrode sheet
30C End-portion negative electrode sheet
30P Central-portion negative electrode sheet
40 Separator
40C End-portion separator
40P Central-portion separator
50 Core member
51 Outer surface
80 Battery case
100 Vehicle
200 Hammer drill (Battery mounting device)
AX Winding axis
CS Transverse section
DA Long-side direction
DB Short-side direction

The invention claimed is:

1. A lithium ion secondary battery comprising:
a flat wound electrode body of a flat transverse section, including a strip-shaped positive electrode sheet and a strip-shaped negative electrode sheet that are wound about a winding axis while interposing strip-shaped separators therebetween; and
a battery case containing the flat wound electrode body,
wherein the flat wound electrode body is configured so that
a central portion located at a center in a long-side direction of the transverse section is pressed toward the winding axis in a short-side direction to have a more constricted shape than end portions in the long-side direction located respectively at both ends in the long-side direction,
the end portions each include:
an end-portion positive electrode sheet, an end-portion negative electrode sheet, and end-portion separators, each being curved to form the end portion, of the positive electrode sheet, the negative electrode sheet, and the separators; and
a pair of separate core members located more inward than the end-portion positive electrode sheet, the end-portion negative electrode sheet, and the end-portion separators, each of the core members including at least an outer surface located outside in the long-side direction that is a cylindrical surface that protrudes outward in the long-side direction and is parallel to the winding axis,
with tensile forces generated, by pressing of the central portion, in a central-portion positive electrode sheet, a central-portion negative electrode sheet, and central-portion separators, forming the central portion of the positive electrode sheet, the negative electrode sheet, and the separators, the end-portion positive electrode sheet, the end-portion negative electrode sheet, and the end-portion separators are placed in pressure contact with each other and press the outer surface of each of the core members, and
the central portion is configured so that all of the central-portion positive electrode sheet, the central-portion negative electrode sheet, and the central-sheet separators are laminated in pressure contact with each other in the short-side direction.

2. A vehicle mounted with the lithium ion secondary battery according to claim 1, wherein the vehicle uses electrical energy stored in the lithium ion secondary battery as a whole or a part of a power source.

3. A battery mounting device mounted with the lithium ion secondary battery according to claim 1, wherein the device uses electrical energy stored in the lithium ion secondary battery as a whole or a part of a drive energy source.

* * * * *